B. O. CUDDIGAN.

POTATO CUTTING MACHINE.

APPLICATION FILED DEC. 11, 1918.

Reissued Aug. 12, 1919.

14,704

2 SHEETS—SHEET 1.

Witness,
F. S. Mann

Inventor,
Bartholomew O. Cuddigan
By Frank L. Belknap
Atty.

THE COLUMBIA PLANOGRAPH CO., WASHINGTON, D. C.

B. O. CUDDIGAN.

POTATO CUTTING MACHINE.

APPLICATION FILED DEC. 11, 1918.

Reissued Aug. 12, 1919.

14,704.

2 SHEETS—SHEET 2.

Witness,
T. B. Mann

Inventor,
Bartholomew O. Cuddigan
By Frank L. Belknap
Atty.

UNITED STATES PATENT OFFICE.

BARTHOLOMEW O. CUDDIGAN, OF WADENA, MINNESOTA, ASSIGNOR OF ONE-THIRD TO W. H. GEHR, OF WADENA, MINNESOTA.

POTATO-CUTTING MACHINE.

14,704. Specification of Reissued Letters Patent. Reissued Aug. 12, 1919.

Original No. 1,273,039, dated July 16, 1918, Serial No. 218,855, filed February 23, 1918. Application for reissue filed December 11, 1918. Serial No. 266,307.

*To all whom it may concern:*

Be it known that I, BARTHOLOMEW O. CUDDIGAN, a citizen of the United States, residing at Wadena, in the county of Wadena and State of Minnesota, have invented a new and useful Potato-Cutting Machine, of which the following is a specification.

This invention relates to machines for cutting seed potatoes into several parts or pieces preparatory to the planting and the object is to provide a cheap, simple and practical potato cutting machine which may be operated partly or entirely by hand power.

Figure 1:
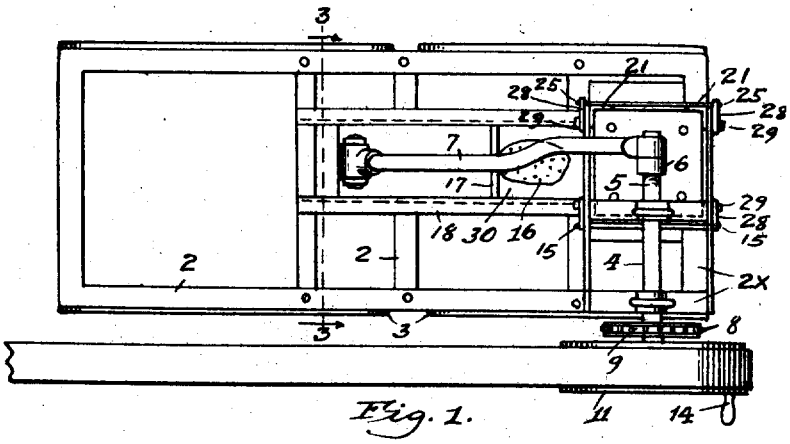
Figure 1 is a top view of my improved potato cutter.
Figure 3:
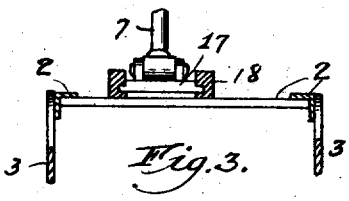
Fig. 3 is a cross section on the line 3—3 in Fig. 1.
Figure 2:
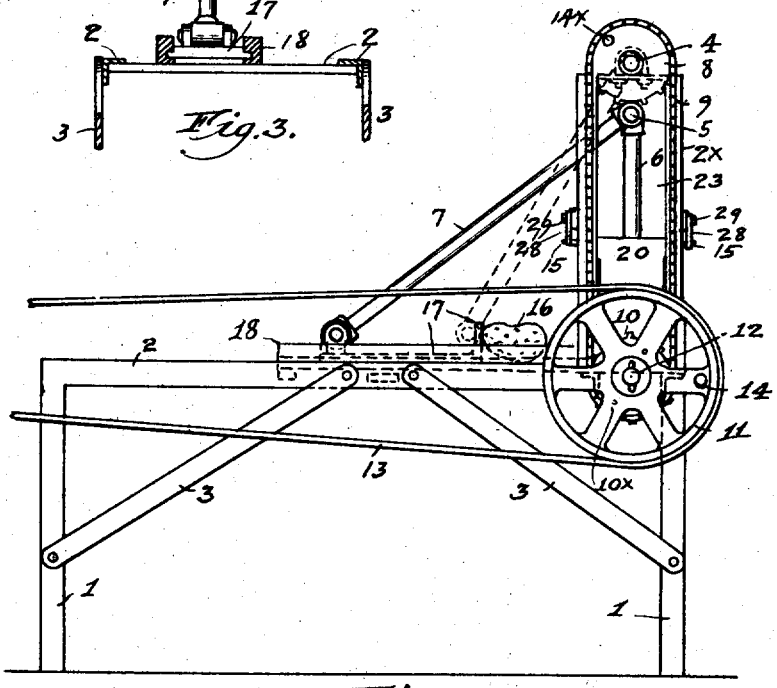
Fig. 2 is a side elevation of the same.

Referring to the drawings by reference numerals, 1 designates legs upon which a main frame 2 is mounted and made firm by braces 3. In an upward extension 2ˣ of the frame is journaled a shaft 4 having a crank 5, which operates two rods 6 and 7. Said shaft is provided with a sprocket 8, which is driven by a link-belt 9 from a sprocket 10. The latter is secured at 10ˣ to a pulley 11 and with the pulley rotatably mounted on a stud 12. Said pulley may be driven by a belt 13 or a handle 14 where belt power may not be available.

Figure 6:
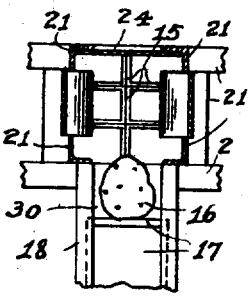
Fig. 6 is a detail section on the line 6—6 in Fig. 5.

Near what may be termed the rear end of the main frame is fixed a cutting device composed of crossing cutter blades 15, (see Fig. 6) arranged with their edges upward. In upon said cutting device the potatoes are moved one by one, in the position indicated by a potato 16, by a horizontal slide 17, which is mounted in guides 18 forming a channel 30 and operated by the rod 7.

Figure 4:
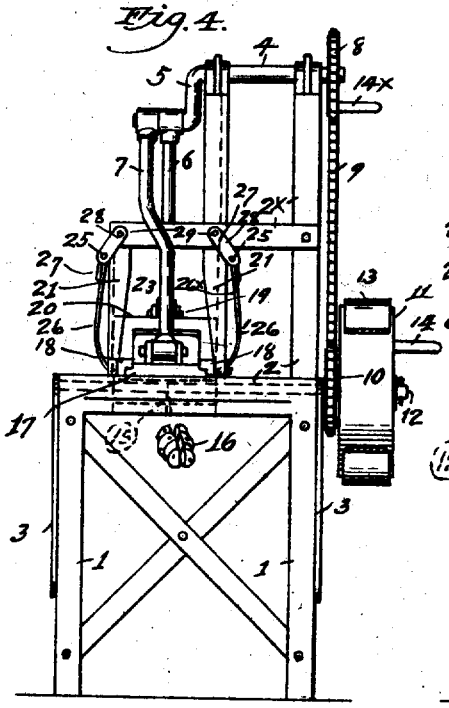
Fig. 4 is Fig. 2 seen from left to right.
Figure 5:
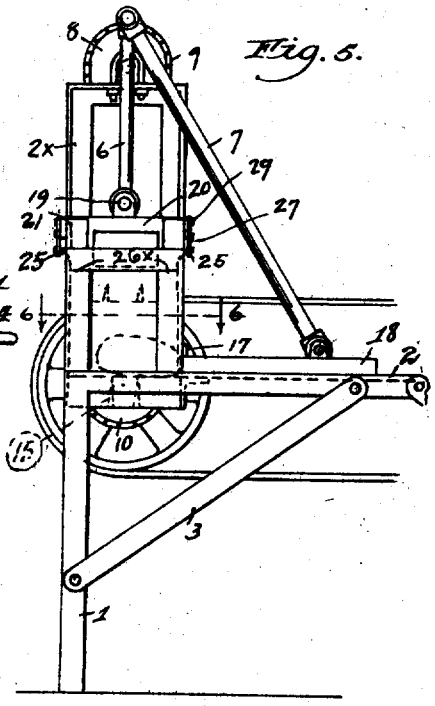
Fig. 5 is a portion of Fig. 4 viewed from left to right.
Figure 7:
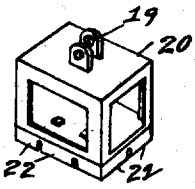
Fig. 7 is a perspective view of the plunger or head that presses the potatoes against the cutter blades.

The other rod, 6 is pivoted at 19 to a skeletoned plunger 20, which has its corners guided in upright angle iron bars 21 of the frame and has its bottom end or face formed with projections 22, (see Fig. 7) adapted to push the potato through the set of knives or blades until it drops as indicated at 16 in Fig. 4.

Figure 8:
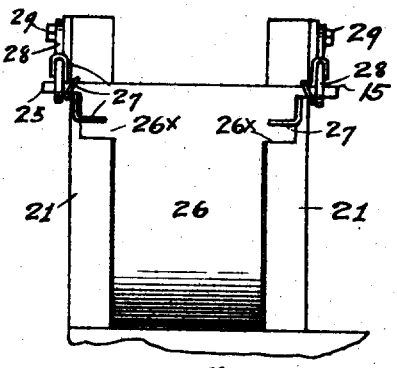
Fig. 8 is a portion of Fig. 5 enlarged.

The chamber 23 in which the plunger 20 moves may have its front side open and its rear side closed by a wall 24 (see Figs. 4 and 6); and in each of the other sides is pivoted at 25 a plate 26. The lower ends of said plates converge together and serve to hold each potato, whether small or large, at the middle of the cutting device 15. Each plate is at all times impelled inward by springs 27 (best shown in Fig. 8), and is pivoted in a pair of arms 28 which are secured on the frame work each one by single bolt or screw 29.

In the operation of the machine if power is available the belt 13 is driven and while the machine is thus run, the operator drops the potatoes one by one into the channel 30 (see Fig. 6) as fast as the slide 17 gets into position to permit it, and as the plunger 20 descends upon each potato and acts upon the inner sides of the plates 26 to spread them and leave the potato resting upon the cutters in position to be cut, and is cut by being pushed through the cutters.

As the plunger ascends again the springs 27 close in the plates 26 until their shoulders 26ˣ (see Fig. 8) stop against the posts 21 and leave the lower edges of the plates so close together as to guide even the smallest seed potato to the center of the cutting device 15. If the potatoes operated on are extra small or extra large the space between the lower ends of the plates may be varied by loosening the screws 29 and changing the arms 28 to a more or less inclined position. For it is obvious that the more horizontal those arms stand the farther the plates will close against the posts 21, and the more the arms are lowered the earlier said shoulders 26ˣ will touch the posts and limit the closing of the plates.

If no power is available the machine may be operated by a handle placed either in the pulley 11 as 14, or in the sprocket 8, as 14ˣ. When operated by hand one person may turn the crank shaft 4, and another person feed in the potatoes, or for light potato farming the same person may turn the machine with one hand and feed it with the other hand. In any case a receptacle (not shown) is placed underneath the frame to receive the cut potatoes.

I claim as my invention:

1. In a potato cutting machine, a frame, a plunger movable therein, a cutting device in the base of the frame for dividing and sub-dividing the article and curved guide plates spring pressed inwardly in the path of the plunger to direct the article to a central position and adapted to be pushed aside by the plunger as it descends, a horizontal slide for feeding the article to the cutting device, and operating means for the plunger and slide comprising a shaft having its inner end cranked and rods extending from said crank portion to said plunger and slide, so that movement of the parts is properly timed, substantially as described.

2. In a potato cutting machine, a frame support, a cutting device a vertically reciprocating plunger, a chamber in which the plunger operates, spring plates constituting part of the wall of the chamber and a horizontally moving plunger adapted to feed the potatoes laterally beneath the plunger and between the spring plates, substantially as described.

3. In a potato cutting machine, a frame support, a cutting device, a vertically reciprocating plunger, angle bars in which the plunger is guided, an inclosing wall and movable spring pressed plates adjustably supported for guiding the potato to the center of the cutting device, said plates being curved and adapted to be pushed aside in the descent of the plunger and means for feeding the potato laterally into the space beneath the plunger and between the spring plates.

BARTHOLOMEW O. CUDDIGAN.

Copies of this patent may be obtained for five cents each, by addressing the "Commissioner of Patents, Washington, D. C."